US009250843B2

(12) United States Patent
Hashimoto

(10) Patent No.: US 9,250,843 B2
(45) Date of Patent: Feb. 2, 2016

(54) IMAGE FORMING SYSTEM AND IMAGE FORMING METHOD

(71) Applicant: Yuuta Hashimoto, Tokyo (JP)

(72) Inventor: Yuuta Hashimoto, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/499,666

(22) Filed: Sep. 29, 2014

(65) Prior Publication Data

US 2015/0098096 A1    Apr. 9, 2015

(30) Foreign Application Priority Data

Oct. 9, 2013 (JP) .................................. 2013-212204
Aug. 22, 2014 (JP) .................................. 2014-169790

(51) Int. Cl.
*G06K 15/02* (2006.01)
*G06F 3/12* (2006.01)
*G06Q 10/10* (2012.01)

(52) U.S. Cl.
CPC ............ *G06F 3/1242* (2013.01); *G06F 3/1219* (2013.01); *G06F 3/1285* (2013.01); *G06Q 10/10* (2013.01)

(58) Field of Classification Search
USPC .......................... 358/1.15, 1.16, 1.6; 709/217
See application file for complete search history.

(56) References Cited

U.S. PATENT DOCUMENTS

| 7,594,604 B2* | 9/2009 | Haas ..................... G06K 1/121 235/380 |
| 8,566,355 B2* | 10/2013 | Jeong et al. ................... 707/787 |
| 8,693,787 B2* | 4/2014 | Kim et al. ..................... 382/206 |
| 8,854,660 B2* | 10/2014 | Evevsky ............... G06F 3/1243 358/1.13 |
| 2014/0009417 A1* | 1/2014 | Sugimoto ..................... 345/173 |
| 2014/0032705 A1* | 1/2014 | Williams et al. .............. 709/217 |

FOREIGN PATENT DOCUMENTS

| JP | 2003-122872 |   | 4/2003 |
| JP | 2003122872 A | * | 4/2003 |
| JP | 2008-171350 |   | 7/2008 |

\* cited by examiner

*Primary Examiner* — Allen H Nguyen
(74) *Attorney, Agent, or Firm* — Oblon, McClelland, Maier & Neustadt, L.L.P.

(57) ABSTRACT

An image forming system includes an input unit that receives input of visitor information on a visitor; a creating unit that creates an information image including the visitor information received by the input unit; an acquiring unit that acquires the information image; a permit creating unit that creates permit data by placing an image, which includes the visitor information and indicates permission for visitor's access, on a printing medium and placing an image indicating added information on a blank space of the printing medium where no image is placed in accordance with a predetermined layout on the basis of the information image; and an issuing unit that issues a permit for visitor's access by printing an image in which the image indicating permission for access and the image indicating added information are placed on the printing medium by using the permit data.

12 Claims, 20 Drawing Sheets

FIG.12

| VISITOR NAME | VISITOR'S COMPANY NAME | VISITOR INFORMATION E-MAIL ADDRESS OF NOTIFICATION MAIL DESTINATION | VALID PERIOD OF QR CODE |
|---|---|---|---|
| RICOH TAROH | XXXX CORPORATION | ricoh.taroh@xxxx.com | EFFECTIVE DATE: June 12, 2013 EXPIRY DATE: June 13, 2013 |

FIG.13

| VISITOR NAME | VISITOR'S COMPANY NAME | VISITED DATE AND TIME |
|---|---|---|
| RICOH TAROH | XXXX CORPORATION | 10:10 ON June 12, 2013 |

| ACCESS-PASS ISSUING SYSTEM Please enter visitor information |||
|---|---|---|
| SETTING ITEM | CONTENT | ORDER OF PRIORITY |
| LAYOUT | LAYOUT A ⊙ | - |
| VISITOR NAME | RICOH TAROH | 1 |
| VISITOR'S COMPANY | ○○○○ CO., LTD. | 2 |
| VISITOR'S OCCUPATION | DESIGN AND DEVELOPMENT | 3 |
| VISITEE NAME | MUKAI RIKO | 4 |
| NUMBER OF VISITS | 1 | 5 |
| INTERESTS | MOBILE TECHNOLOGY, SECURITY ⊙ ✚ | 6 |
| AGE | 30 | 7 |
| ━ ✚ | | |
| | | |
| | COMPLETION OF ENTRY | |

FIG.25

| Add Interest(s) |
|---|
| Please select from the following |
| Cloud technology |
| Mobile technology |
| Web technology |
| Information security |
| Display more |

FIG.26

| Set Content of Interest to be Printed |
|---|
| Please select from the following |
| Type of Interest |
| Next seminar information of Interest |
| Latest news of Interest |
| Ad for Interest |
| Display more |

FIG.27

| Add Setting Item |
|---|
| Please select from the following |
| Visitor's photo |
| Visitor's department |
| Building layout |
| Notes |
| Display more |

FIG.28

| ACCESS-PASS ISSUING SYSTEM<br>Please enter visitor information ||| |
|---|---|---|
| SETTING ITEM | CONTENT | ORDER OF PRIORITY |
| LAYOUT | LAYOUT A ⊙ | – |
| VISITOR NAME | RICOH TAROH | 1 |
| VISITOR'S COMPANY | ○○○○ CO., LTD. | 2 |
| VISITOR'S OCCUPATION | DESIGN AND DEVELOPMENT | 3 |
| VISITEE NAME | MUKAI RIKO | 4 |
| NUMBER OF VISITS | 1 | 5 |
| INTERESTS | MOBILE TECHNOLOGY, SECURITY ⊙ ✚ | 6 |
| AGE | | 7 |

Entry Completed

Your reception number is "20130930-121"

IMAGE FORMING SYSTEM AND IMAGE FORMING METHOD

CROSS-REFERENCE TO RELATED APPLICATIONS

The present application claims priority to and incorporates by reference the entire contents of Japanese Patent Application No. 2013-212204 filed in Japan on Oct. 9, 2013 and Japanese Patent Application No. 2014-169790 filed in Japan on Aug. 22, 2014.

BACKGROUND OF THE INVENTION

1. Field of the Invention

The present invention relates to an image forming system and an image forming method.

2. Description of the Related Art

There is known a visit reception device intended to manage visitors entering and leaving the building at low cost while ensuring security; the visit reception device receives input of visit appointment information and transmits a reception number to visitor's terminal, and receives the reception number from an access-pass issuing device, and transmits access pass information including authentication information corresponding to the reception number to the access-pass issuing device.

However, the size of an access pass issued through a conventional visit reception device is mismatched with the size of printing paper. Specifically, even an access pass printed with a variety of information, such as one's face photo in the same size as an ID photo (3 cm×4 cm) and a two-dimensional bar code, has usually the same size as a business card (9.1 cm×5.5 cm), i.e., is small in size as compared with printing paper; therefore, there is a problem that it is not possible to make effective use of paper.

Especially, an access pass is to be issued to a visitor as quickly as possible; therefore, it is difficult to print plural visitors' access passes at once. Furthermore, due to the nature that only a person who has received special permission is permitted to enter the building, unlike business cards, it is not possible to print plural access passes at once to eliminate the waste of blank space.

Japanese Patent Application Laid-open No. 2008-171350 has disclosed a visitor management system in which a visit reception device transmits a reception number corresponding to visit appointment information to visitor's terminal, and an access-pass issuing device receives input of the reception number and transmits the reception number to the visit reception device, and the visit reception device transmits authentication information to the access-pass issuing device, and the access-pass issuing device prints the authentication information on a printing medium and outputs the printing medium, and an entrance gate device reads the authentication information when the printing medium has been presented and transmits the authentication information to the visit reception device, and the visit reception device determines whether to permit the visitor to enter the building and transmits control information based on a result of the determination to the entrance gate device, and then the entrance gate device gets a gate to work on the basis of the control information.

However, it may not be possible to issue a permit for visitor's access by using a blank space on a printing medium effectively.

Therefore, there is a need for an image forming system and image forming method capable of issuing a permit for visitor's access by using a blank space on a printing medium effectively.

SUMMARY OF THE INVENTION

It is an object of the present invention to at least partially solve the problems in the conventional technology.

The present invention provides an image forming system that forms an image on a printing medium. The image forming system includes an input unit that receives input of visitor information on a visitor; a creating unit that creates an information image including the visitor information received by the input unit; an acquiring unit that acquires the information image; a permit creating unit that creates permit data by placing an image, which includes the visitor information and indicates permission for visitor's access, on a printing medium and placing an image indicating added information on a blank space of the printing medium where no image is placed in accordance with a predetermined layout on the basis of the information image; and an issuing unit that issues a permit for visitor's access by printing an image in which the image indicating permission for access and the image indicating added information are placed on the printing medium by using the permit data. The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram showing an example of components of data to be encoded into a QR Code™;

FIG. 13 is a diagram showing an example of components of a visitor-information notification mail;

FIG. 25 is a diagram showing an example of a setting-content addition screen displayed on the reception device;

FIG. 26 is a diagram showing an example of a setting-item addition screen displayed on the reception device;

FIG. 27 is a diagram showing an example of a setting-content setting screen displayed on the reception device;

FIG. 28 is a diagram showing an example of an entry completion screen displayed an the reception device;

DETAILED DESCRIPTION OF THE PREFERRED EMBODIMENTS

Figure 1:
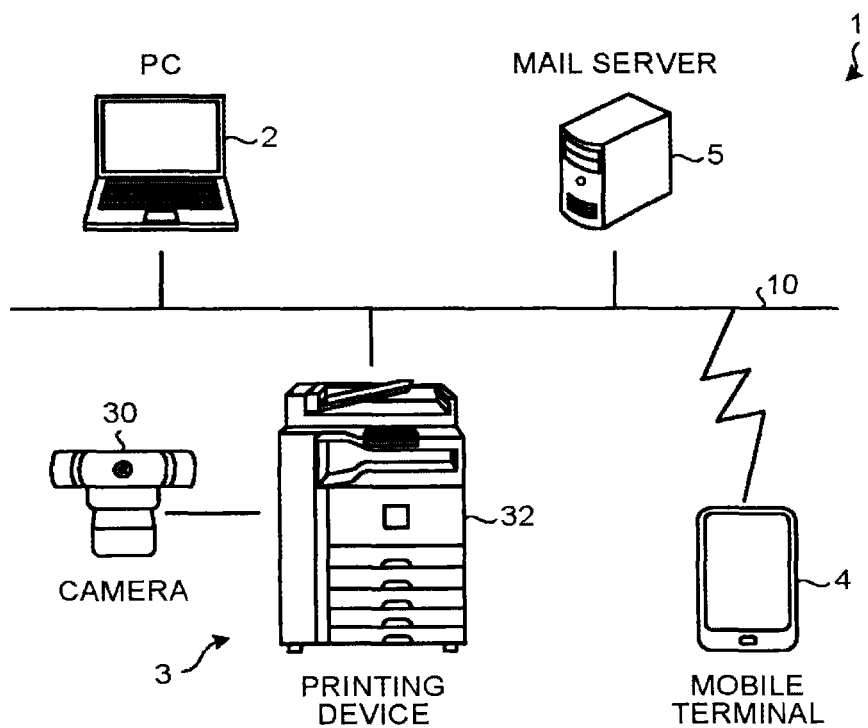
FIG. 1 is a diagram showing an example of a configuration of an image forming system according to an embodiment.

An image forming system according to an embodiment is explained in detail below with reference to accompanying drawings. FIG. 1 is a diagram showing an example of a configuration of an image forming system 1 according to the embodiment. As shown in FIG. 1, the image forming system 1 includes a personal computer (PC) 2 (an information processing apparatus), a terminal device 3, a mobile terminal 4, and a mail server 5 which are connected to one another via a wired or wireless network 10. The terminal device 3 includes, for example, a camera (an image pickup device) 30 for acquiring image information and a printing device (an image forming apparatus) 32 for printing an image. Incidentally, just like the PC 2 and the mail server 5, the terminal device 3 and the mobile terminal 4 are each equipped with a CPU, a storage device, an input device, and a display device (for example, a touch panel, or a keyboard and a mouse), etc. and have a function as a computer.

Figure 2:
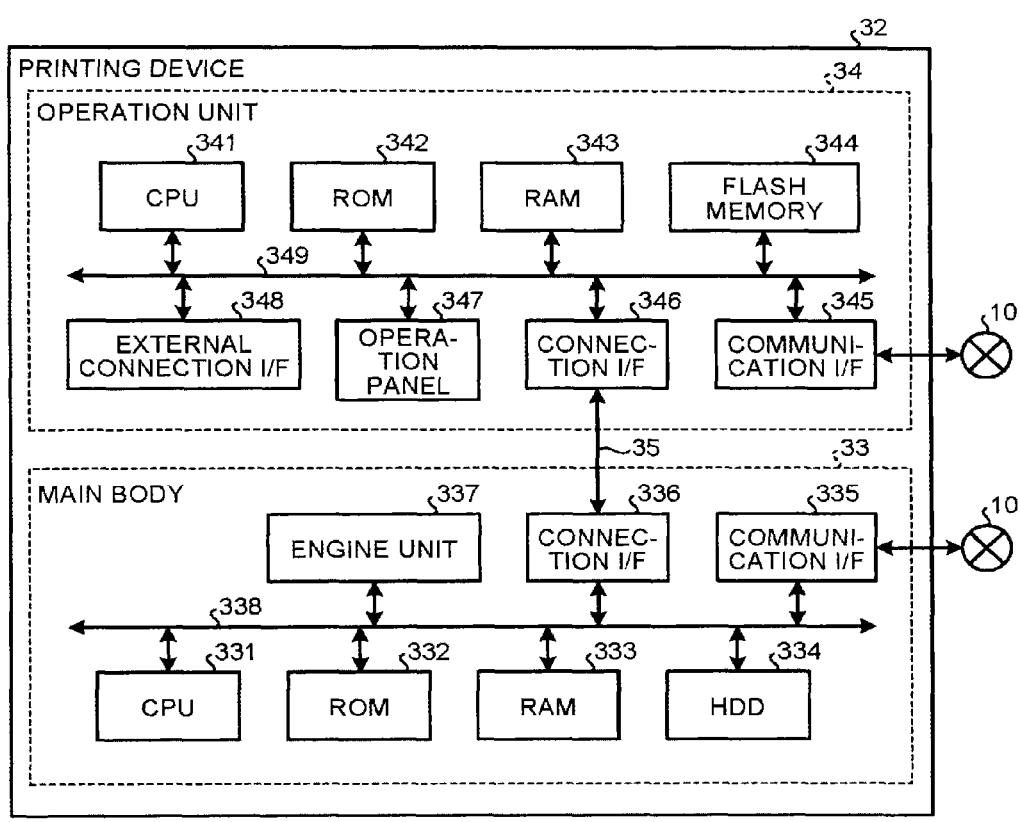
FIG. 2 is a diagram showing a hardware configuration of a printing device.

Subsequently, a hardware configuration of the printing device 32 is explained with FIG. 2. As shown in FIG. 2, the printing device 32 includes a main body 33 and an operation unit 34; the main body 33 can realize various functions such as a copy function, a scanner function, a fax function, and a printer function, etc. and the operation unit 34 receives a user's operation. Incidentally, receiving a user's operation is general idea including to receive information (including a signal indicating a screen coordinate value, etc.) input according to the user's operation. The main body 33 and the operation unit 34 are connected through a dedicated communication path 35 so that the main body 33 and the operation unit 34 can communicate with each other. As the communication path 35, for example, one meeting the universal serial bus (USB) standards can be used; however, the one meeting any other standards can be also used regardless of whether the one is wired or wireless.

Incidentally, the main body 33 can work according to an operation received by the operation unit 34. Furthermore, the main body 33 can communicate with an external device such as a client personal computer (PC), and can work according to an instruction received from the external device.

First, a hardware configuration of the main body 33 is explained. As shown in FIG. 2, the main body 33 includes a CPU 331, a ROM 332, a RAM 333, a hard disk drive (HDD) 334, a communication interface (I/F) 335, a connection I/F 336, and an engine unit 337, and these are connected to one another via a system bus 338.

The CPU 331 controls the operation of the main body 33 overall. The CPU 331 executes a program stored in the ROM 332 or the HDD 334, etc. with the RAM 333 as a work area, thereby controlling the action of the entire main body 33 and realizing various functions such as the above-mentioned copy function, scanner function, fax function, and printer function, etc.

The communication I/F 335 is an interface for connecting to the network 10. The connection I/F 336 is an interface for communicating with the operation unit 34 through the communication path 35.

The engine unit 337 is hardware that performs processing other than general information processing and communication to realize the copy function, the scanner function, the fax function, and the printer function. For example, the engine unit 337 is equipped with a scanner (an image reading unit) that reads an image of an original by scanning the original, a plotter (an image forming unit) that prints an image on a sheet material such as a sheet of paper, and a fax unit that performs fax communication, etc. Furthermore, the engine unit 337 can be equipped with specific options such as a finisher for sorting printed sheet materials and an automatic document feeder (ADF) for automatically feeding originals.

Next, a hardware configuration of the operation unit 34 is explained. As shown in FIG. 2, the operation unit 34 includes a CPU 341, a ROM 342, a RAM 343, a flash memory 344, a communication I/F 345, a connection I/F 346, an operation panel 347, and an external connection I/F 348, and these are connected to one another via a system bus 349.

The CPU 341 controls the action of the operation unit 34 overall. The CPU 341 executes a program stored in the ROM 342 or the flash memory 344, etc. with the RAM 343 as a work area, thereby controlling the action of the entire operation unit 34 and realizing various functions such as a function of displaying information (an image) according to input received from a user.

The communication I/F 345 is an interface for connecting to the network 10. The connection I/F 346 is an interface for communicating with the main body 33 through the communication path 35.

The operation panel 347 receives various inputs according to a user's operation, and displays thereon a variety of information (for example, information according to the received operation, information indicating the action state of the printing device 32, and information indicating the settings, etc.). In this example, the operation panel 347 is composed of a liquid crystal display device (LCD) with a touch panel function; however, the operation panel 347 is not limited to this. For example, the operation panel 347 can be composed of an organic EL display device with a touch panel function. Furthermore, in addition to this or instead of this, the operation panel 347 can be provided with an operation unit, such as hardware keys, and a display unit, such as a lamp.

Figure 3:
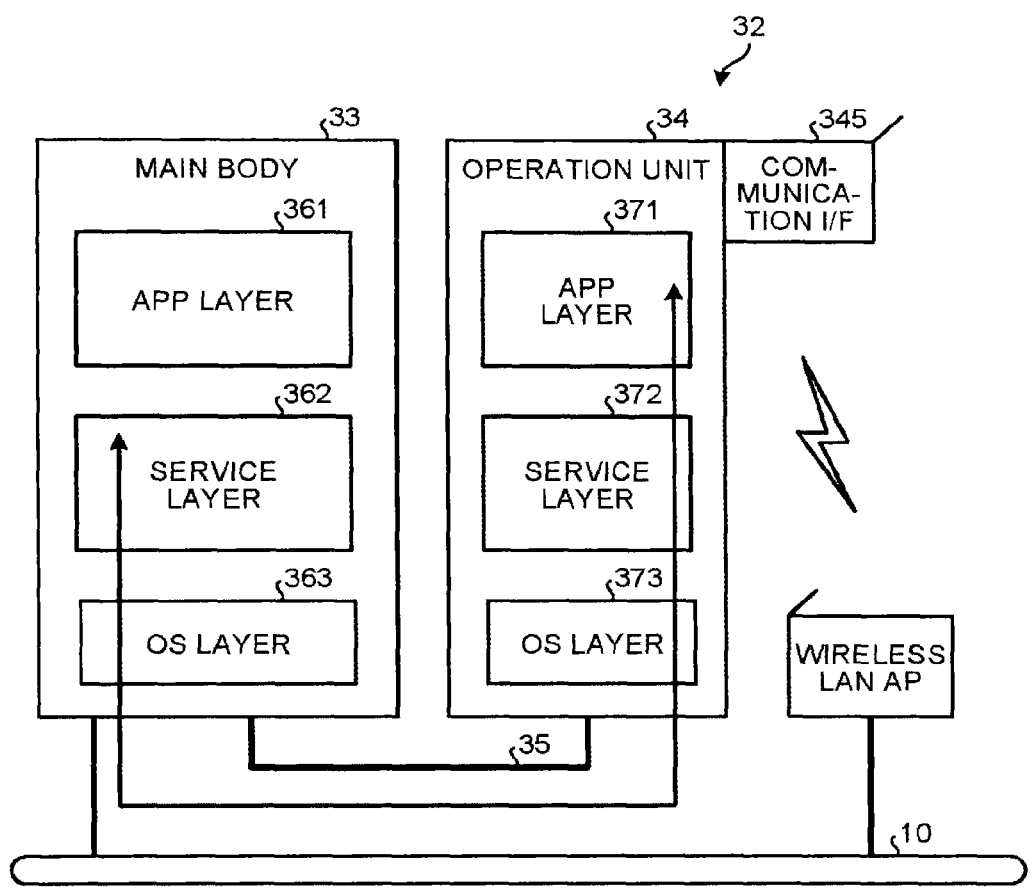
FIG. 3 is a schematic diagram showing an example of a software configuration of the printing device.

Subsequently, a software configuration of the printing device 32 is explained. FIG. 3 is a schematic diagram showing an example of a software configuration of the printing device 32. As shown in FIG. 3, the main body has an app layer 361, a service layer 362, and an OS layer 363. The substances of the app layer 361, the service layer 362, and the OS layer 363 are various kinds of software stored in the ROM 332 and the HDD 334, etc. The CPU 331 executes these kinds of software, thereby various functions are provided.

Software of the app layer 361 is application software (hereinafter, sometimes referred to simply as "app") for providing a specified function by activating a hardware resource. For example, the app includes a copy app for providing a copy function, a scanner app for providing a scanner function, a fax app for providing a fax function, and a printer app for providing a printer function, etc.

Software of the service layer 362 is software that lies between the app layer 361 and the OS layer 363 and is for providing an interface for using a hardware resource included in the main body 33 to an app. More specifically, the software of the service layer 362 is software for providing functions of receiving an action request to a hardware resource and mediating the action request. An action request that the service layer 362 receives may be a request for scanner reading or a request for plotter printing, etc.

Incidentally, the interface function of the service layer 362 is provided to not only the app layer 361 of the main body 33 but also an app layer 371 of the operation unit 34. That is, the app layer 371 (app) of the operation unit 34 can also realize a function using a hardware resource (for example, the engine unit 337) of the main body 33 through the interface function of the service layer 362.

Software of the OS layer 363 is basic software (an operating system) for providing a basic function of controlling hardware included in the main body 33. The software of the service layer 362 converts a request for use of a hardware resource from an app into a command that the OS layer 363 can interpret, and passes the command to the OS layer 363. Then, the software of the OS layer 363 executes the command, thereby the hardware resource acts in accordance with the app's request.

Likewise, the operation unit 34 has the app layer 371, a service layer 372, and an OS layer 373. The hierarchical structure of the app layer 371, the service layer 372, and the OS layer 373 included in the operation unit 34 is the same as that on the main body 33 side. However, functions provided by app of the app layer 371 and types of action requests that the service layer 372 can receive are different from those on the main body 33 side. The app of the app layer 371 can be software for providing a specified function by activating a hardware resource included in the operation unit. 34, but is software for mainly providing a function of a user interface (UI) for performing an operation or display related to any functions (the copy function, the scanner function, the fax function, and the printer function) included in the main body 33.

Incidentally, in the present embodiment, to maintain the independence of the functions, the software of the OS layer 363 on the main body 33 side and the software of the OS layer 373 on the operation unit 34 side are different from each other. That is, the main body 33 and the operation unit 34 work independently of each other on separate operating systems. For example, Linux™ can be used as the software of the OS layer 363 on the main body 33 side, and Android™ can be used as the software of the OS layer 373 on the operation unit 34 side.

As described above, in the printing device 32 according to the present embodiment, the main body 33 and the operation unit 34 work on the separate operating systems; therefore, communication between the main body 33 and the operation unit 34 is performed not as interprocess communication in a single device but as communication between different devices. An action of transmitting information (content of an instruction from a user) received by the operation unit 34 to the main body 33 (command communication) and an action of the main body 33 notifying the operation unit 34 of an event correspond to this. Here, the operation unit 34 performs command communication with the main body 33, thereby can use a function of the main body 33. Furthermore, events notified from the main body 33 to the operation unit 34 include the execution state of an action in the main body 33 and content set on the main body 33 side, etc.

Furthermore, in the present embodiment, power supply the operation unit 34 is performed by the main body 33 through the communication path 35; therefore, power control of the operation unit 34 can be performed separately from (independently of) power control of the main body 33.

Figure 4:
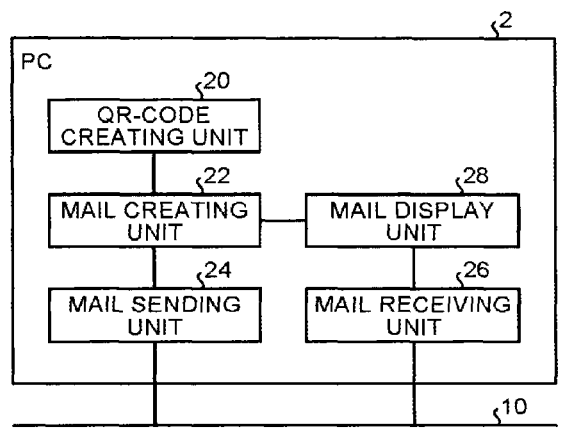
FIG. 4 is a functional block diagram showing an example of functions that a PC has.

Subsequently, a functional configuration of the printing device 32 is explained. FIG. 4 is a functional block diagram showing an example of functions that the PC 2 has. As shown in FIG. 4, the PC 2 includes a QR-code creating unit 20, a mail creating unit 22, a mail sending unit 24, a mail receiving unit 26, and a mail display unit 28.

The QR-code creating unit 20 is a module that creates a QR Code™ (an information image) including information (to be described later with FIG. 12) which indicates information on an input visitor (visitor information) such as visitor name and visitor's company name, mail (e-mail) address of a person who treats the visitor, such as a visitee with whom the visitor has an appointment (notification destination information), and the valid period of the QR code. Incidentally, the QR-code creating unit 20 has a function as an information-image creating unit that creates not only a QR code but also an information image embedded with, for example, information that a visitor cannot read.

The mail creating unit 22 is a module that creates a mail addressed to a visitor; a QR code created by the QR-code creating unit 20 is attached to the mail.

The mail sending unit 24 is a module that sends a mail (an e-mail) created by the mail creating unit 22 to the mail server 5 via the network 10. The mail receiving unit 26 is a module that receives a mail about a notification on a visitor via the network 10. The mail display unit 28 is a module that displays the mail received by the mail receiving unit 26.

Incidentally, the QR-code creating unit 20, the mail creating unit 22, the mail sending unit 24, and the mail receiving unit 26 are included in, for example, an application is QR-code creating app) executed by the PC 2. That is, a person who treats a visitor, such as a visitee with whom the visitor has an appointment, executes the QR-code creating app by using the PC 2, thereby being capable of creating a QR code and sending a mail with the QR code attached.

Furthermore, the PC 2 can have a function as a notifying unit that receives a visitor-information notification mail to be described later, thereby notifying a person who treats a visitor, such as a visitee with whom the visitor has an appointment, of his/her visit.

Figure 5:
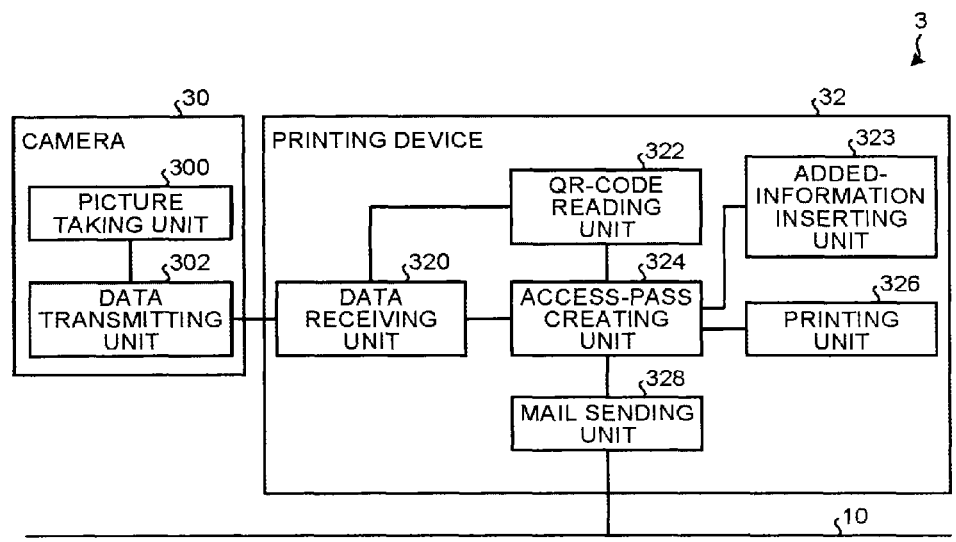
FIG. 5 is a functional block diagram showing an example of functions that terminal devices have.

FIG. 5 is a functional block diagram showing an example of functions that the terminal device 3 has. The camera 30 and printing device 32 included in the terminal device 3 are configured to communicate with each other, for example, by wired communication.

The camera 30 includes a picture taking unit 300 and a data transmitting unit 302. The picture taking unit 300 is a module that takes a picture of a QR code and generates image data, and also functions as an acquiring unit that acquires image information. The data transmitting unit 302 is a module that transmits the image data of the QR code (the QR code image) generated by the picture taking unit 300 to the terminal device 3.

The printing device 32 includes a data receiving unit 320, a QR-code reading unit 322, an added-information inserting unit 323, an access-pass (permit) creating unit 324, a printing unit 326, and a mail sending unit 328, and has a function as an issuing unit that issues a permit.

The data receiving unit 320 is a module that receives a QR code image transmitted by the data transmitting unit 302 of the camera 30 via the network 10, and also functions as an acquiring unit that acquires information contained in the QR code image.

The QR-code reading unit 322 is a module that reads a QR code image received by the data receiving unit 320 and acquires information contained in the QR code image, which indicates visitor information, mail address of a person who treats the visitor, and the valid period of the QR code, etc.

The added-information inserting unit 323 is a module that inserts added information set in advance into a blank space on a print sheet (a printing medium) in accordance with a layout set in advance.

The layout on a print sheet and added information to be inserted are set by an administrator in advance. For example, in the case of setting added information, an operator first selects the print sheet size on a screen displayed by an application executed by the PC 2 (or the printing device 32), and then determines which position on a print sheet an access pass is placed. The determination of this placement is made in such a manner that an image of one or both sides of the print sheet is displayed on the screen, and the operator drags a graphic indicating an access-pass print area to the desired position with a mouse or by a touch operation.

When the placement of the access pass in the print sheet has been determined, the operator selects an image to be printed on the blank space, and sets which position on the print sheet the selected image is printed by dragging the image to the desired position by a touch operation or with the mouse in the same manner as the access pass. An image to be printed on a blank space can be selected from images stored in the PC 2 or the printing device 32. For example, an image of a building layout and, if the building is a venue for a seminar, images of the day's schedule, an advertisement, and a notice of the next seminar to be held, etc. can be selected.

The layout can be set as one likes, or can be selected from default layouts. Furthermore, in the present embodiment, the administrator sets a layout in advance; however, a visitor can select a layout.

Figure 6:
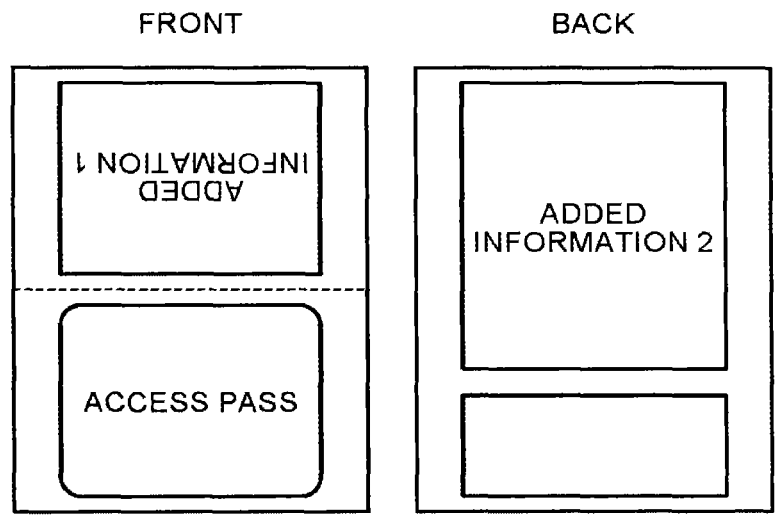
FIG. 6 is a diagram showing a first layout example.
Figure 7:
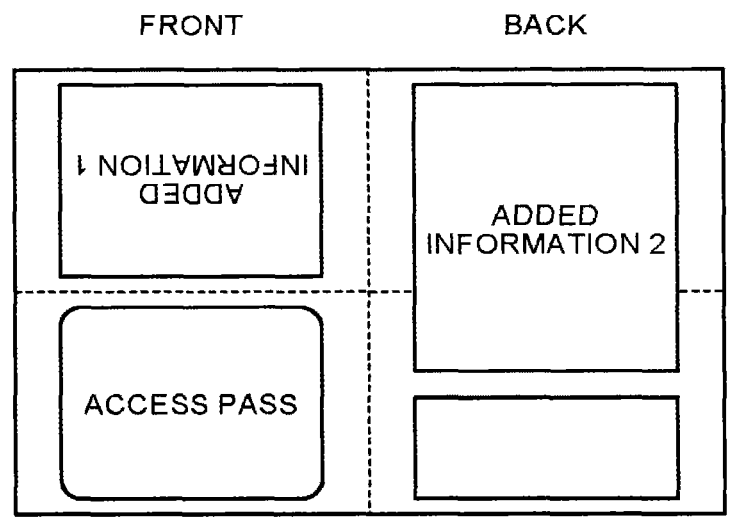
FIG. 7 is a diagram showing a second layout example.

FIG. 6 is a diagram showing a first layout example. FIG. 7 is a diagram showing a second layout example. The first layout example is an example of a layout on an A6 sheet (105 mm×148 mm) with an access pass and added information 1 printed on the front side and added information 2 printed on the back side. The second layout example is an example of a layout on a B6 sheet (128 mm×182 mm) with an access pass and two pieces of added information 1 and 2 printed on one side.

In either layout example, the printed sheet is folded; therefore, the added information 1 can be referenced on the back of the access pass when the sheet is in a folded state, and the added information 2 can be referenced when the sheet is in an open state. In the present embodiment, the added information 1 is visitee's department and visitee's name, and the added information 2 is a building layout. A visitor can easily check visitee's information by flipping the access pass to its back, and can check the building layout by opening out the access pass. It is convenient if added information deemed to be frequently referenced can be checked even when a printed sheet is in a folded state.

The access-pass creating unit 324 (FIG. 5) is a module that creates access pass data by using visitor information acquired by the QR-code reading unit 322 and creates a visitor-information notification mail (to be described later with FIG. 13) to notify a person who treats a visitor of his/her visit, for example, when an access pass is printed. Here, the access-pass creating unit 324 creates permit data by placing an image, which includes the visitor information and indicates a permit for visitor's access, on a printing medium and placing an image indicating added information on a blank space of the printing medium where no image is placed in accordance with a predetermined layout on the basis of a QR code.

Furthermore, when drawing a drawing item, the access-pass creating unit 324 determines whether there is a blank space in a drawing area of the printing medium, and draws the item if there is a blank space or does not draw the item if there is no blank space. Moreover, the access-pass creating unit 324 can create permit data including, for example, information acquired via the network. Furthermore, the access-pass creating unit 324 can change an image indicating added information and place the image each time the access-pass creating unit 324 creates permit data on the basis of visitor information.

The printing unit 326 is a module that prints an image corresponding to access pass data created by the access-pass creating unit 324 on a recording medium such as a sheet. That is, the printing unit 326 has a function as an issuing unit that issues an access pass (a permit). Here, the printing unit 326 prints an image in which an image indicating permission for access and an image indicating added information are placed on a printing medium by using permit data, thereby issuing a permit for visitor's access.

The mail sending unit 328 is a module that sends a visitor-information notification mail created by the access-pass creating unit 324 to the mail server 5.

Incidentally, the terminal device 3 is configured to realize the above-described functions by executing an application (for example, an access-pass issuing application) installed in the terminal device 3.

Figure 8:
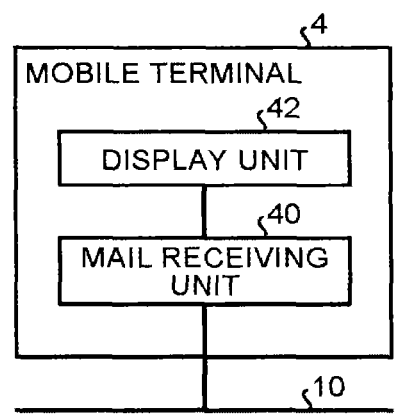
FIG. 8 is a functional block diagram showing an example of functions that a mobile terminal has.

FIG. 8 is a functional block diagram showing an example of functions that the mobile terminal 4 has. As shown in FIG. 8, the mobile terminal 4 includes a mail receiving unit 40 and a display unit 42. The mail receiving unit 40 is a module that receives a mail with a QR code attached sent by the mail server 5 via the network 10. The display unit 42 is a module that displays the QR code attached to the mail received by the mail receiving unit 40 on a screen (not shown) of the mobile terminal 4.

Incidentally, the mobile terminal 4 is configured to realize the above-described functions by executing an application installed in the mobile terminal 4.

Figure 9:
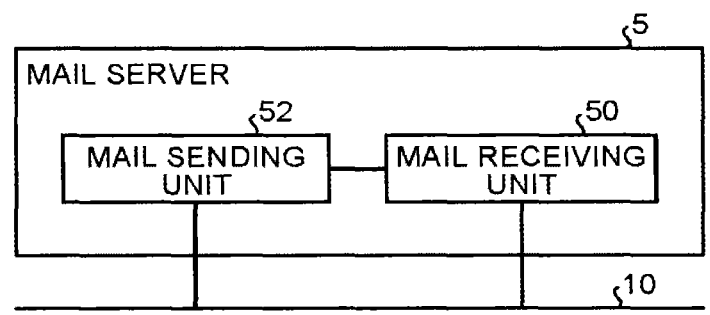
FIG. 9 is a functional block diagram showing an example of functions that a mail server has.

FIG. 9 is a functional block diagram showing an example of functions that the mail server 5 has. As shown in FIG. 9, the mail server 5 includes a mail receiving unit 50 and a mail sending unit 52. The mail receiving unit 50 is a module that receives a mail with a QR code attached sent by the PC 2 and a visitor-information notification mail sent by the printing device 32 via the network 10. The mail sending unit 52 is a module that sends a mail received by the mail receiving unit 50 to a destination set in the mail via the network 10.

Incidentally, respective functions of the PC 2, the terminal device 3, the mobile terminal 4, and the mail server 5 are composed of at least one of software executed by the CPU etc. and hardware.

Figure 10:
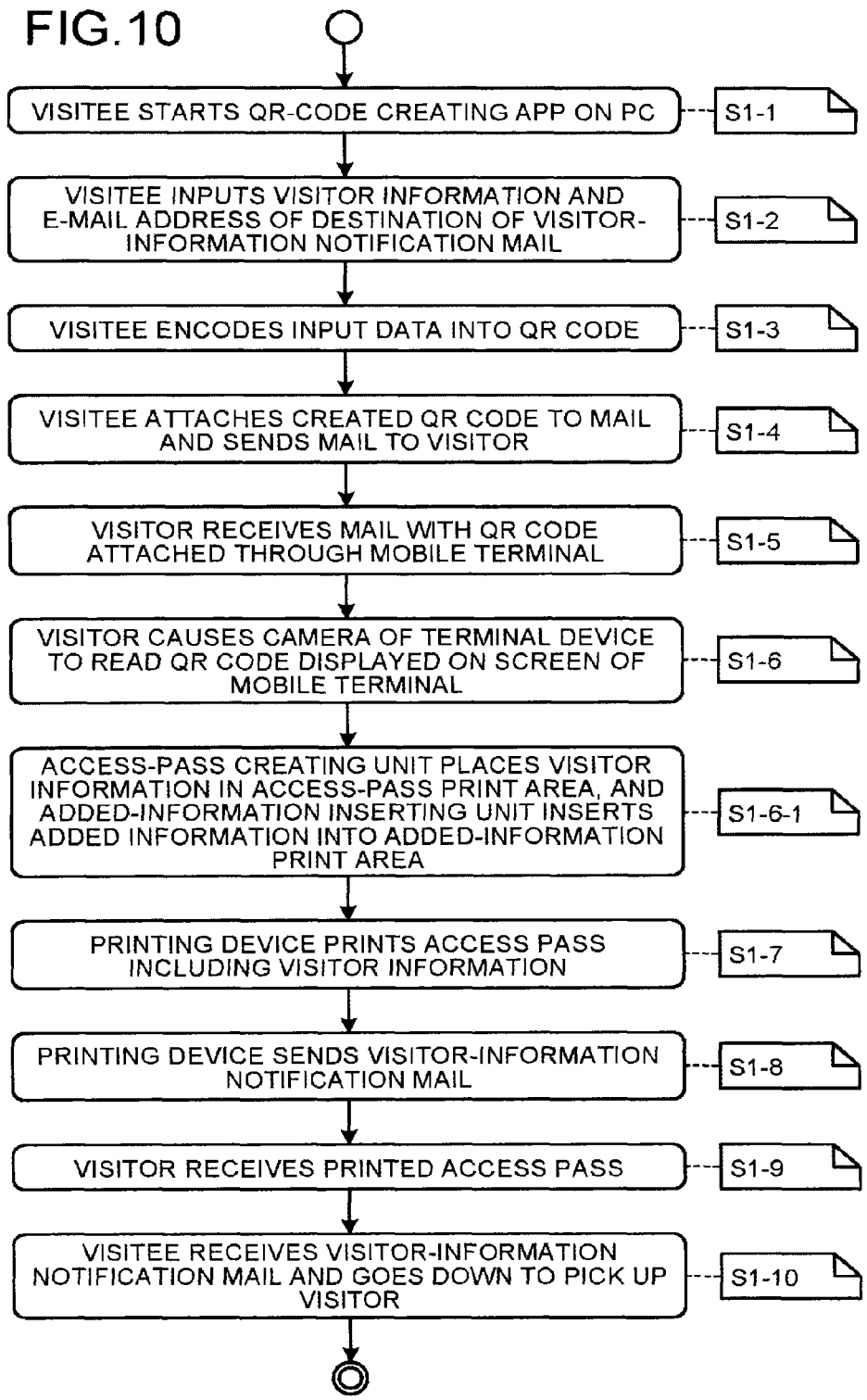
FIG. 10 is a diagram showing a procedure of how the image forming system issues an access pass to a visitor.

Subsequently, a procedure of how the image forming system 1 issues an access pass (an access permit) to a visitor is explained. FIG. 10 is a diagram showing the procedure of how the image forming system 1 issues an access pass to a visitor. As shown in FIG. 10, first, a person who treats the visitor (for example, a visitee) starts a QR-code creating application (app) by using the PC 2 (S1-1).

Next, the visitee inputs visitor information and information such as visitee's e-mail address through an input screen of the QR-code creating app (S1-2). The visitee can input other information such as visitee's name. Furthermore, the visitee can input not visitee's e-mail address but e-mail address of another person as e-mail address of a destination of a visitor-information notification mail.

The visitee encodes the information input at Step S1-2 into a QR code by using the QR-code creating app (S1-3). The QR code is saved as an image.

The visitee attaches the created QR code to a mail and sends the mail to visitor's mobile terminal 4 (S1-4).

The visitor receives the sent mail with the QR code attached through the mobile terminal 4 (S1-5).

When the visitor visits the building, the visitor causes the camera 30 of the terminal device 3 to read the QR code displayed on the screen of the mobile terminal 4 (S1-6).

In accordance with a print layout set in advance, the access-pass creating unit 324 places the visitor information read from the QR code in an access-pass print area, and the added-information inserting unit 323 inserts two pieces of added information 1 and 2 selected in advance into an added-information print area, thereby a print image is created (S1-6-1).

The printing device 32 prints an access pass including the visitor information contained in the QR code read at Step S1-6 (S1-7). At this time, the added information inserted at Step S1-6-1 is also printed together.

While printing the access pass at Step S1-7, the printing device 32 sends a visitor-information notification mail to the visitee's e-mail address read from the QR code (S1-8).

The visitor receives the access pass printed at Step S1-7 (S1-9).

The visitee receives the visitor-information notification mail sent at Step S1-6 through the use of, for example, the PC 2, and goes down to pick up the visitor (S1-10).

Figure 11:
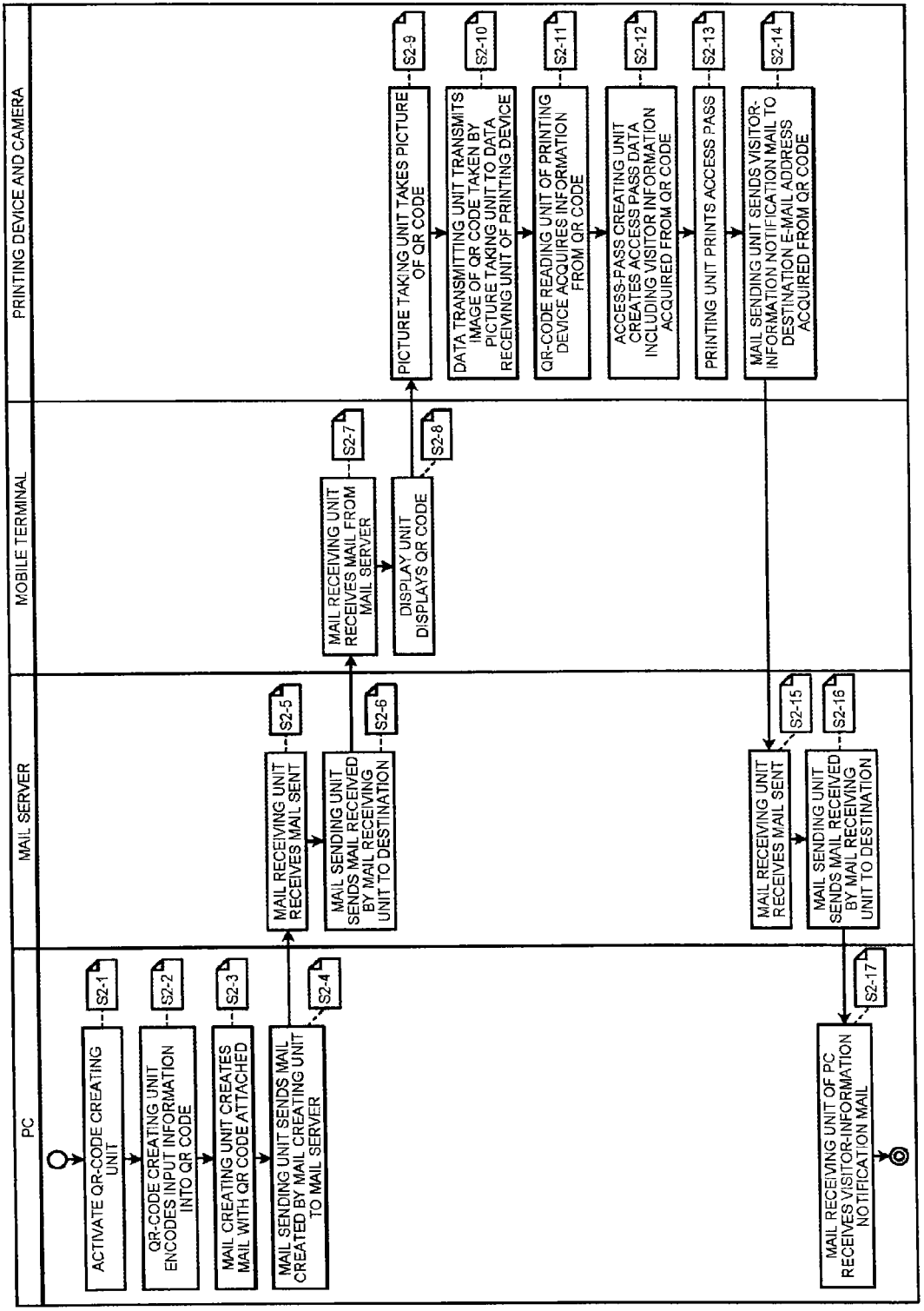
FIG. 11 is a diagram showing the operation of the image forming system when issuing an access pass (an access permit)

Subsequently, the operation of the image forming system 1 when issuing an access pass (an access permit) is explained. FIG. 11 is a diagram showing the operation of the image forming system 1 when issuing an access pass (an access permit). Incidentally, the operation of the image forming system 1 shown in FIG. 11 is explained in a manner corresponding to the procedure shown in FIG. 10.

Through Step S1-1, the PC 2 activates the QR-code creating unit 20 (S2-1).

Through Steps S1-2 and S1-3, the QR-code creating unit 20 of the PC 2 encodes the information (the visitor information, the visitee's e-mail address, and the valid period of the QR code, etc.) input through an input device (an input unit) (not shown) into a QR code (S2-2). The QR code is saved as an image.

Through Step S1-4, the mail creating unit 22 of the PC 2 creates a mail with the QR code attached which is addressed to the visitor (S2-3). The mail sending unit 24 of the PC 2 sends the mail created by the mail creating unit 22 to the mail server 5 (S2-4). The mail receiving unit 50 of the mail server 5 receives the sent mail (S2-5). The mail sending unit 52 of the mail server 5 sends the mail received by the mail receiving unit 50 to a destination (the visitor) (S2-6).

Through Step S1-5, the mail receiving unit 40 of the mobile terminal 4 receives the mail from the mail server 5 (S2-7).

Through Step S1-6, the display unit 42 of the mobile terminal 4 displays the QR code attached to the mail (S2-8). The picture taking unit 300 of the camera 30 takes a picture of the QR code displayed by the display unit 42 and converts the picture of the QR code into image data (S2-9). The data transmitting unit 302 of the camera 30 transmits the image data of the QR code to the data receiving unit 320 of the printing device 32 (S2-10). The QR-code reading unit 322 of the printing device 32 reads the QR code image and acquires the information (the visitor information, the visitee's e-mail address, and the valid period of the QR code, etc.) (S2-11). At this time, when it is determined that the QR code is expired, the mobile terminal 4 displays thereon an error message and does not perform subsequent processes.

Through Steps S1-6-1 and S1-7, the access-pass creating unit 324 of the printing device 32 creates access pass data including the visitor information (S2-12). At this time, two pieces of added information 1 and 2 selected in advance are inserted into an added-information print area in accordance with a print layout set in advance. The printing unit 326 of the printing device 32 prints an access pass by using the created access pass data (S2-13). At this time, the added information inserted at Step S2-12 is also printed together.

Through Step S1-8, the mail sending unit 328 of the printing device 32 sends a visitor-information notification mail to the visitee's e-mail address (the mobile terminal 4) (S2-14). The mail receiving unit 50 of the mail server 5 receives the mail from the printing device 32 (S2-15). The mail sending unit 52 of the mail server 5 sends the mail to a destination (the mobile terminal 4) (S2-16).

Through Step S1-9, the visitor receives the access pass printed at Step S2-13.

Through Step S1-10, the mail receiving unit 26 of the PC-2 receives the visitor information notification mail (S2-17). Then, the visitee looks at the visitor-information notification mail received by the PC-2 and goes down to pick up the visitor.

FIG. 12 is a diagram showing an example of components of data to be encoded into a QR code. As shown in FIG. 12, information to be encoded into a QR code includes visitor name, visitor's company name, e-mail address of a destination of a visitor-information notification mail, and the valid period of the QR code, etc. The e-mail address of a destination of a visitor-information notification mail is visitee's e-mail address. Incidentally, components of data to be encoded into a QR code are not limited to those shown in FIG. 12.

FIG. 13 is a diagram showing an example of components of a visitor-information notification mail. As shown in FIG. 13, the visitor-information notification mail contains visitor name, visitor's company name, and the visit date and time (the date and time of issuance of an access pass). Incidentally, components of a visitor-information notification mail are not limited to those shown in FIG. 13

Subsequently, an example of a screen (an operator interface screen) displayed by the terminal device 3 when the image forming system 1 issues an access pass is explained in order of operation.

Figure 14:
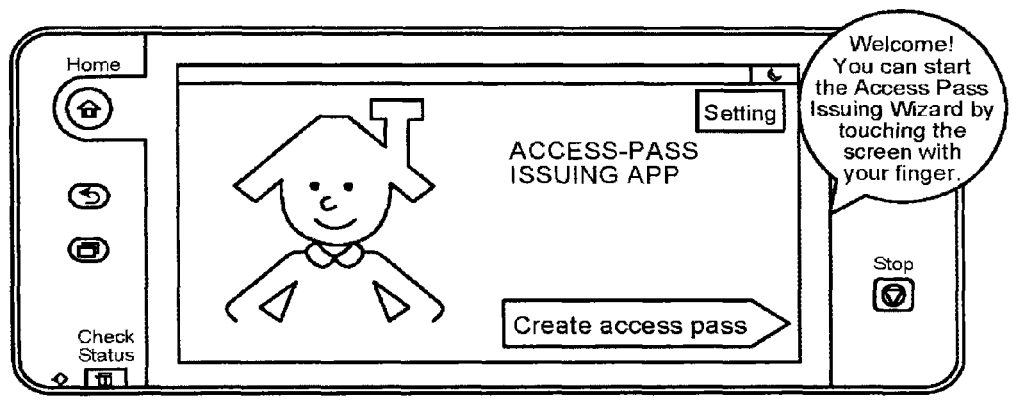
FIG. 14 is a diagram showing an example of a top screen displayed when the printing device has started an access-pass issuing application.

FIG. 14 is a diagram showing an example of a top screen displayed when the printing device 32 has started an access-pass issuing application. The printing device 32 can be configured to execute a guide so that a visitor can input a voice. For example, if a visitor taps an area of "Create access pass" on a touch panel, the printing device 32 switches the display screen to a screen shown in FIG. 15.

Figure 15:
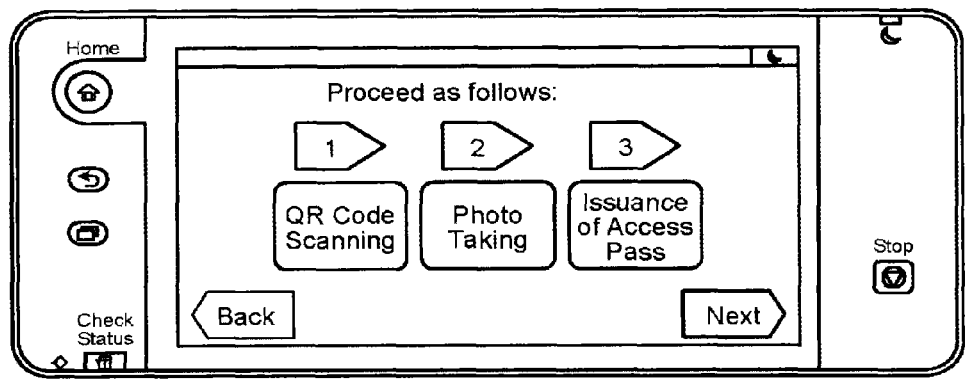
FIG. 15 is a diagram showing an example of a screen displayed on the printing device to show a visitor work steps required for issuance of an access pass.

FIG. 15 is a diagram showing an example of a screen displayed on the printing device 32 to show the visitor work steps required for issuance of an access pass. For example, if the visitor taps an area of "Next" on the touch panel, the printing device 32 switches the display screen to a screen shown in FIG. 16; on the other hand, if the visitor taps an area of "Back", the printing device 32 switches the display screen back to the screen shown in FIG. 14 (the last screen). Hereinafter, the area of "Back" shall receive the same operation.

Figure 16:
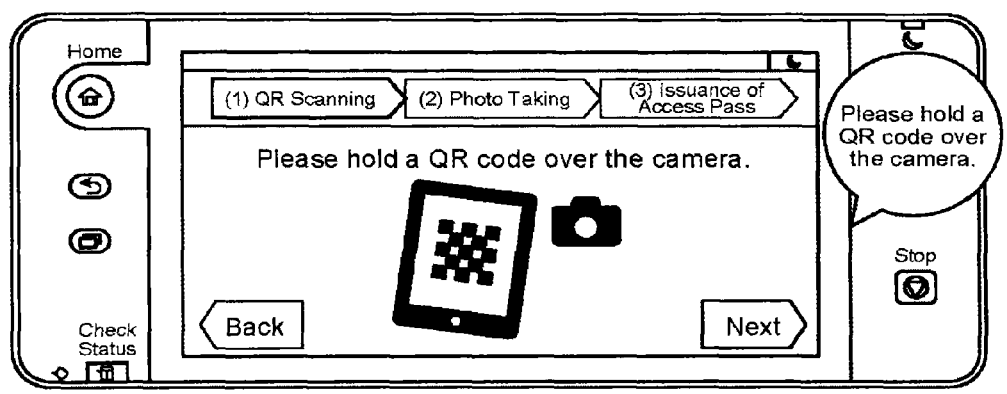
FIG. 16 is a diagram showing an example of a screen displayed on the printing device to prompt the visitor to let a camera read a QR code.

FIG. 16 is a diagram showing an example of a screen displayed on the printing device 32 to prompt the visitor to let the camera 30 read a QR code. When the visitor has held the QR code displayed on the mobile terminal 4 over the camera 30 and tapped the area of "Next" on the touch panel, the printing device 32 causes the camera 30 to start reading the QR code, and the display screen is switched to a screen shown in FIG. 17.

Figure 17:
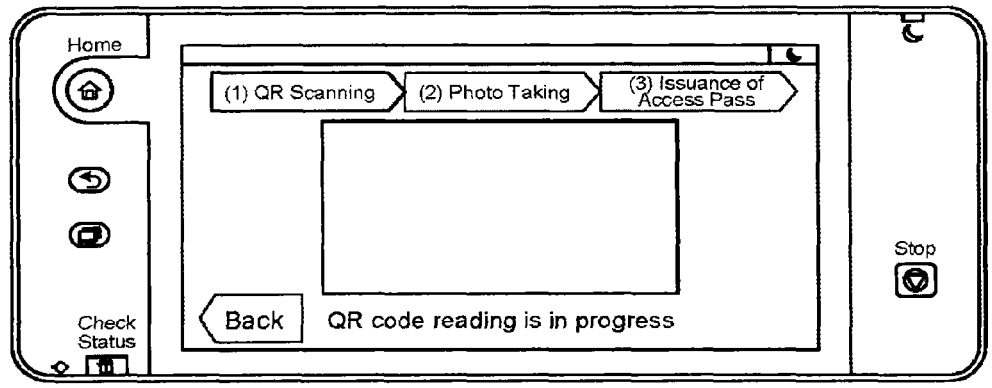
FIG. 17 is a diagram showing an example of a screen displayed on the printing device while the camera is reading the QR code.

FIG. 17 is a diagram showing an example of a screen displayed on the printing device 32 while the camera 30 is reading the QR code. In a rectangular box shown in the central area of FIG. 17, an image taken by the camera 30 is displayed. The visitor holds the mobile terminal 4 over the camera 30 so that an image of the QR code displayed on the mobile terminal 4 is fit within the rectangular box. After completion of the QR code reading, the printing device 32 switches the display screen to a screen shown in FIG. 18.

Figure 18:
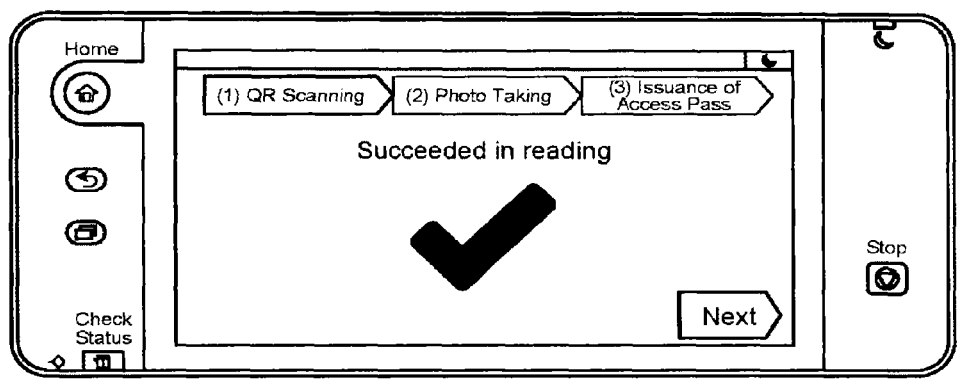
FIG. 18 is a diagram showing an example of a screen displayed on the printing device when the QR code has been successfully read.

FIG. 18 is a diagram showing an example of a screen displayed on the printing device 32 when the QR code has been successfully read. For example, when the visitor has tapped the area of "Next" on the touch panel, the printing device 32 switches the display screen to a screen shown in FIG. 19.

Figure 19:
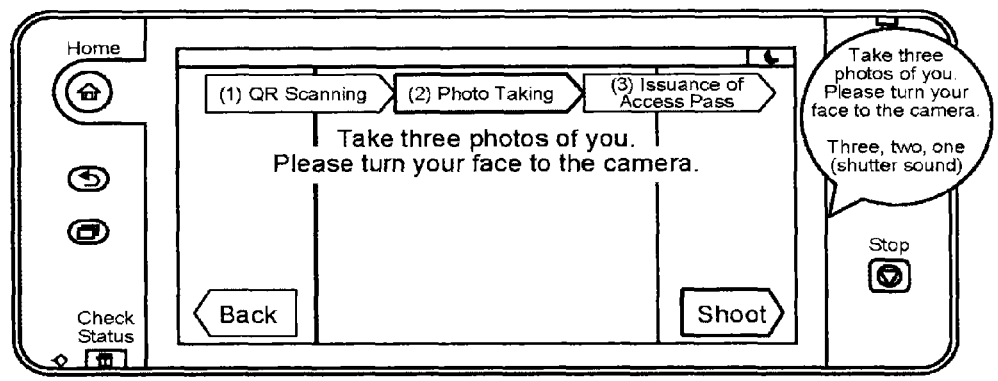
FIG. 19 is a diagram showing an example of a screen displayed on the printing device to prompt the visitor to let the camera take a photo of visitor's face.

FIG. 19 is a diagram showing an example of a screen displayed on the printing device 32 to prompt the visitor to let the camera 30 take a photo of visitor's face. In this example, the visitor's face photo is printed on an access pass. As is the case shown in FIG. 17, the visitor has made an adjustment so that the camera 30 can take a photo of his/her face and tapped an area of "Shoot" on the touch panel of the printing device 32, the camera 30 takes a photo of visitor's face. Then, the printing device 32 displays thereon a screen shown in FIG. 20. In this example, the camera 30 takes three photos.

Figure 20:
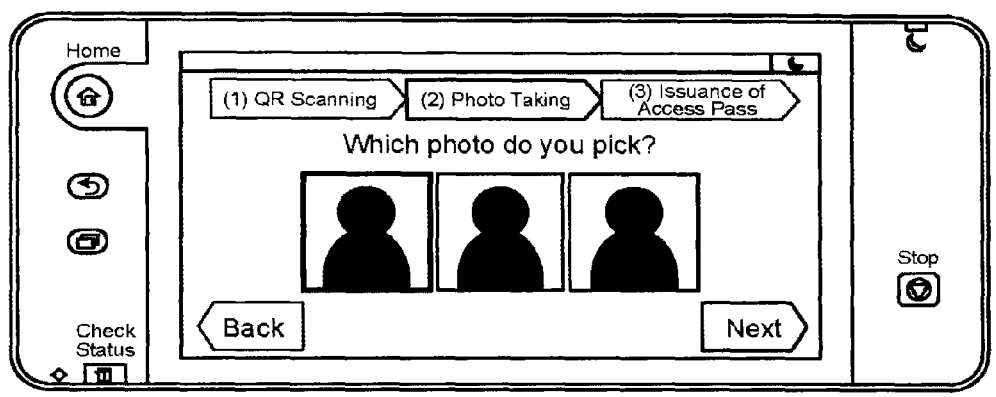
FIG. 20 is a diagram showing an example of a screen displayed on the printing device to enable the visitor to pick one of three face photos taken by the camera.

FIG. 20 is a diagram showing an example of a screen displayed on the printing device 32 to enable the visitor to pick one of the three face photos taken by the camera 30. For example, when the visitor has tapped a photo that he/she wants to pick and then tapped the area of "Next", the printing device 32 switches the display screen to a screen shown in FIG. 21.

Figure 21:
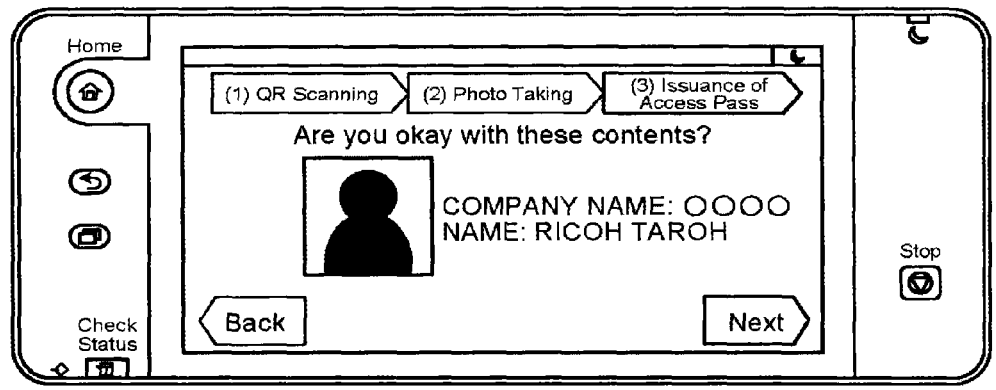
FIG. 21 is a diagram showing an example of a screen displayed to make the visitor check contents of an access pass to be printed by the printing device.

FIG. 21 is a diagram showing an example of a screen displayed to make the visitor check contents of an access pass to be printed by the printing device 32. The printing device 32 displays thereon information and visitor's face photo to be printed on an access pass to get final confirmation of contents before the access pass is issued. The visitor checks the contents to be printed and, if there is no problem, taps the area of "Next". When the area of "Next" has been tapped, the printing device 32 starts printing (issuing) the access pass, and switches the display screen to a screen shown in FIG. 22. At switching the display screen, the printing device 32 sends a visitor-information notification mail to an e-mail address of a destination of the visitor-information notification mail corresponding to the QR code.

Figures 22, 23:
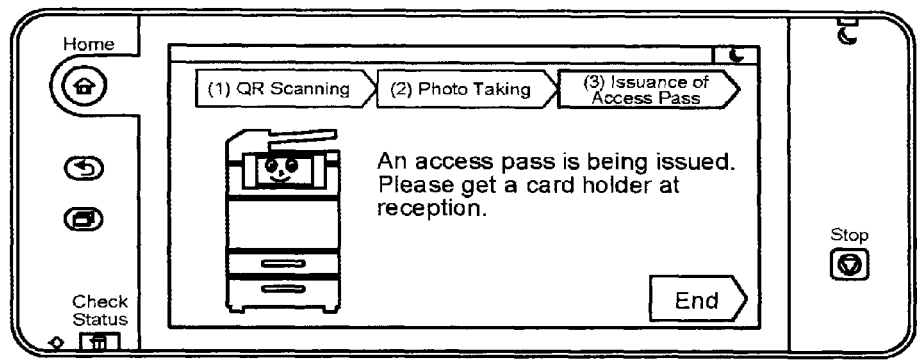
FIG. 22 is a diagram showing an example of a screen displayed on the printing device to inform the visitor that an access pass is going to be printed.
FIG. 23 is a diagram showing an example of an input screen displayed on a reception device.

FIG. 22 is a diagram showing an example of a screen displayed on the printing device 32 to inform the visitor that an access pass is going to be issued. The visitor waits until an access pass is printed, and receives the access pass. For example, when the visitor has tapped an area of "End" on the touch panel, the printing device 32 switches the display screen to the top screen (FIG. 14). On the printed access pass, added information is also printed, for example, in accordance with the layout shown in FIG. 6 or 7.

Incidentally, in the absence of a QR code (for example, when the visitor forgot to prepare display of a QR code or when the mobile terminal 4 failed to receive a mail with a QR code attached), instead of the camera 30 reading a QR code, the terminal device 3 can be configured to be able to input visitor information through the input device.

That is, according to the image forming system 1, a visitor does not have to write visitor information on a form at the time of visit. Furthermore, the image forming system 1 sends a visitor-information notification mail to a visitee at the time of issuance of an access pass; therefore, it is possible to shorten the visitor waiting time. Moreover, an image including visitor information is printed on an access pass; therefore, it is possible to confirm visitor's identity.

A variant of the image forming system 1 is explained. In the variant of the image forming system 1, the PC 2 functions as a reception device. Furthermore, the printing device 32 functions as an access-pass issuing device. Moreover, a QR code may be treated as a reception number.

FIG. 23 is a diagram showing an example of an input screen displayed on the reception device (the PC 2). The input screen shown in FIG. 23 enables an operator to set contents to be printed. Settable items include, for example, setting item, setting content, and order of priority. The "setting item" indicates a type of content to be printed. In accordance with operator's instruction, an item can be added to the input screen. The setting "content" indicates content to be printed or content. Character entry or content can be selected. The "order of priority" is for determining priorities of contents to be printed. When there are many contents to be printed, high-priority contents are printed, and low-priority contents are not printed. A visitor can use his/her mobile terminal 4 to access the PC 2 via a browser.

Figure 24A:
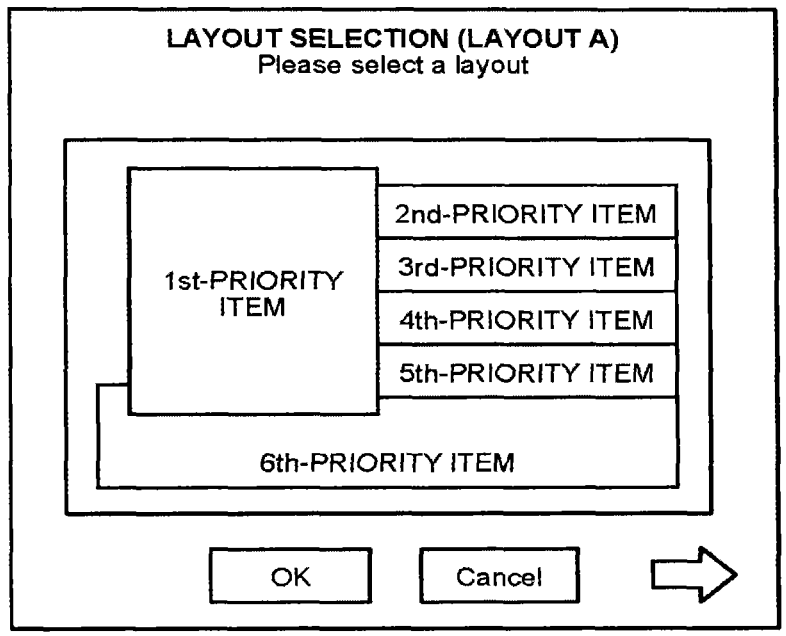
FIG. 24A and FIG. 24B are diagrams showing examples of a layout selection screen displayed on the reception device.
Figure 24B:
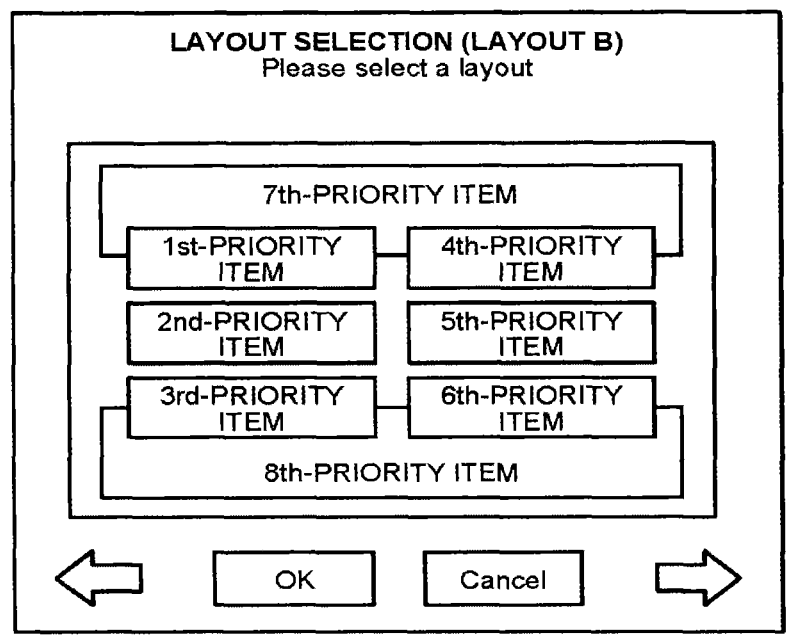

FIG. 24A and FIG. 24B are diagrams showing examples of a layout selection screen displayed on the reception device. The layout selection screens shown in FIG. 24A and FIG. 24B are displayed when an operator has instructed to set a layout through the input screen. Then, the operator can set the layout of contents to be printed. Furthermore, the operator can set a layout set by a system administrator in advance. Moreover, a person who treats a visitor can edit the layout as he/she likes.

FIG. 25 is a diagram showing an example of a setting-content addition screen displayed on the reception device. The setting-content addition screen shown in FIG. 25 is displayed when an operator has instructed to add a setting content through the input screen. Settable contents are configured to be able to be set by the system administrator in advance. A setting content can be set by free format entry.

FIG. 26 is a diagram showing an example of a setting-item addition screen displayed on the reception device. The setting-item addition screen shown in FIG. 26 is displayed when an operator has instructed to add a setting item through the input screen. Settable items and details of contents are configured to be able to be set by the system administrator in advance. For example, when an advertisement for an interest in mobile technology is selected, a pre-registered mobile or mobile-related advertisement is printed on an access pass.

FIG. 27 is a diagram showing an example of a setting-content setting screen displayed on the reception device. The setting-content setting screen shown in FIG. 27 is displayed when an operator has instructed to change the setting of setting content through the input screen. Setting items are configured to be able to be set by the system administrator in advance. A setting item can be set by free format entry.

FIG. 28 is a diagram showing an example of an entry completion screen displayed on the reception device. The entry completion screen shown in FIG. 28 is displayed when an operator has instructed to complete the entry through the input screen, and information required for issuance of visitor's access pass is displayed. The information displayed can be other display contents other than a QR code as long as the information can represent a reception number.

Figure 29:
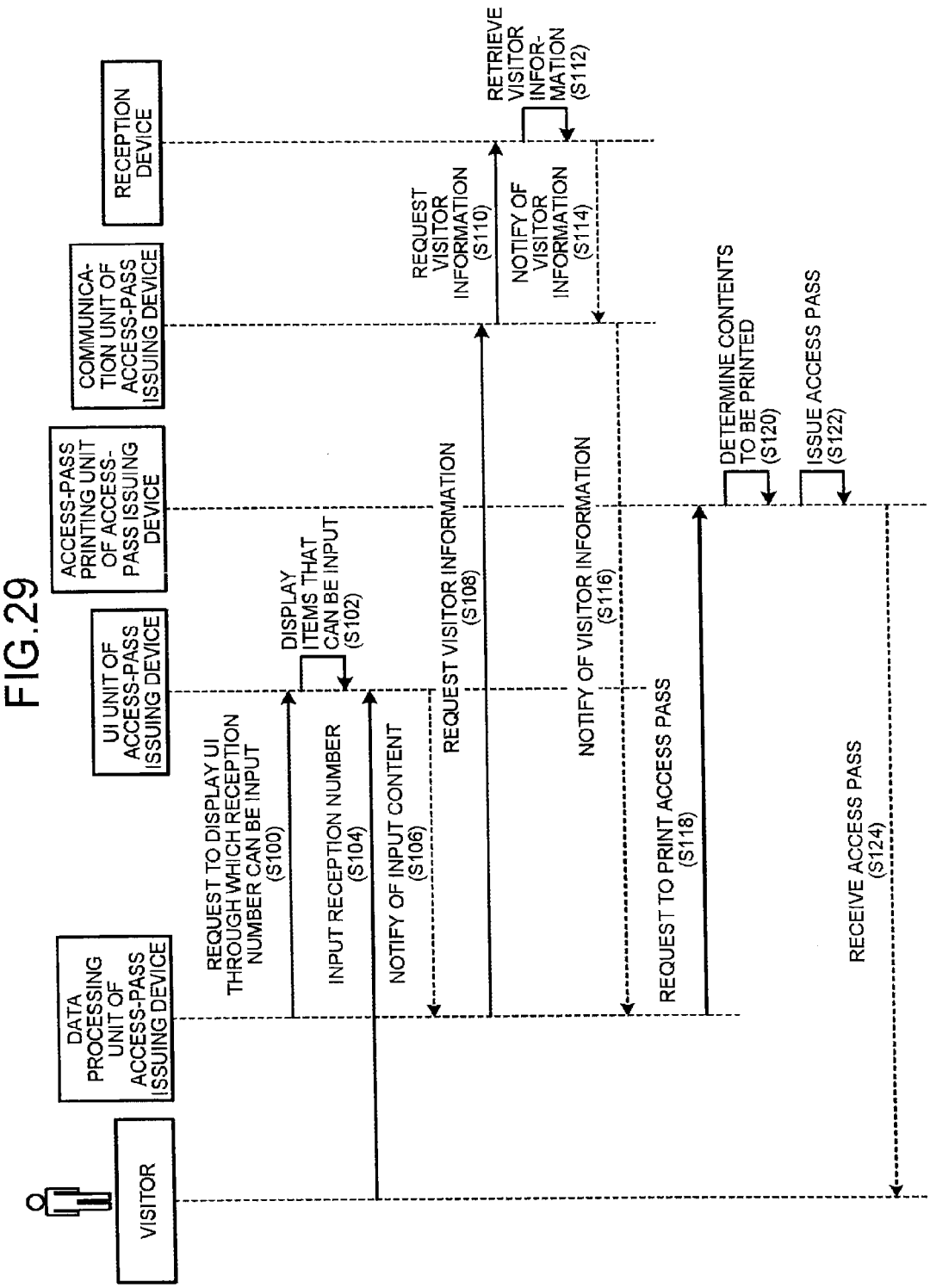
FIG. 29 is a diagram showing the procedure from input of a reception number to issuance of an access pass.

FIG. 29 is a diagram showing the procedure from input of a reception number to issuance of an access pass. A data processing unit of the printing device (access-pass issuing device) 32 requests a display device to display a screen (UI) through which a reception number can be input (S100).

The display device (a UI unit) of the printing device 32 displays a screen through which a reception number can be input (S102). A visitor inputs a reception number through the UI unit (S104). The UI unit notifies the data processing unit of the input content (S106).

The data processing unit transmits the reception number to a communication unit of the access-pass issuing device, and requests visitor information from the access-pass issuing device (S108). The communication unit transmits the reception number to a reception device, and requests visitor information from the reception device (S110).

The reception device retrieves and reads all visitor information from a data storage device included in the reception device (S112). The reception device notifies the communication unit of the visitor information (S114).

The communication unit notifies the data processing unit of the visitor information (S116). The data processing unit transmits the visitor information to an access-pass printing unit and requests the access-pass printing unit to print an access pass (S118).

The access-pass printing unit determines contents to be printed on the basis of the visitor information (S120). The access-pass printing unit issues an access pass (S122). The visitor receives the access pass (S124).

Figure 30:
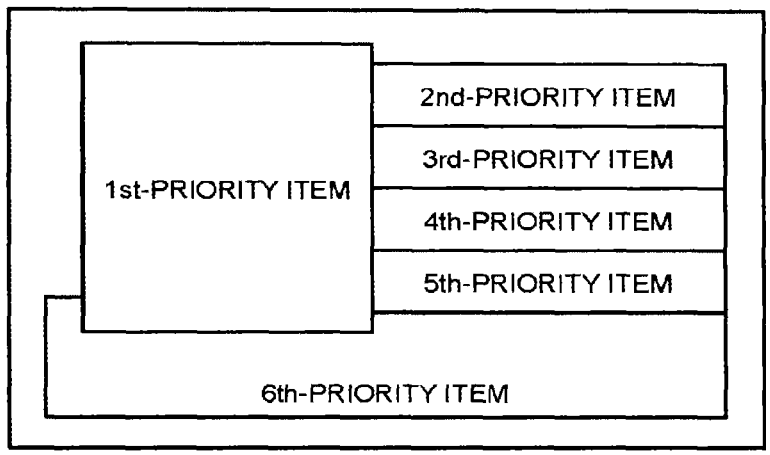
FIG. 30 is a diagram showing a layout example of an access pass.

Subsequently, the specific layout of an access pass is explained. FIG. 30 is a diagram showing a layout example of an access pass. Contents set by a receptionist are applied to the layout of an access pass. Information set by the receptionist is printed in each item of the order of priority. In a low-priority item, information displayed can be other display contents other than a QR code as long as the information can represent a reception number.

Figure 31:
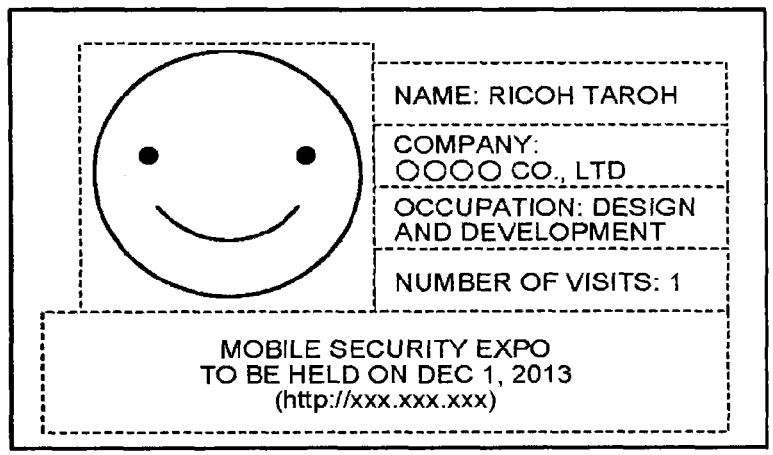
FIG. 31 is a diagram showing the layout of an access pass (before it is printed)

FIG. 31 is a diagram showing the layout of an access pass (before it is printed). The printing device 32 creates an image of an access pass printed with all priority items before the access pass is actually printed. Then, the printing device 32 draws items in descending order of priority. Furthermore, when the printing device 32 draws an item, the printing device 32 determines whether a drawing area is a blank space, and draws the item if there is a blank space or does not draw the item if there is no blank space. Moreover, when there is a certain range of area (a rectangular or circular area, etc.), the printing device 32 can draw an item in the area without specifying a location in advance.

Figure 32:
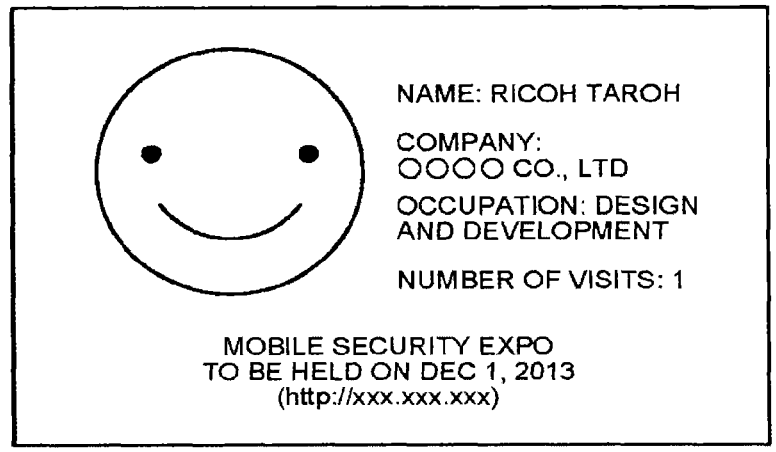
FIG. 32 is a diagram showing the layout of the access pass (printed)

FIG. 32 is a diagram showing the layout of the access pass (printed). As shown in FIG. 32, contents presented before the access pass is printed are drawn to be an access pass.

Figure 33:
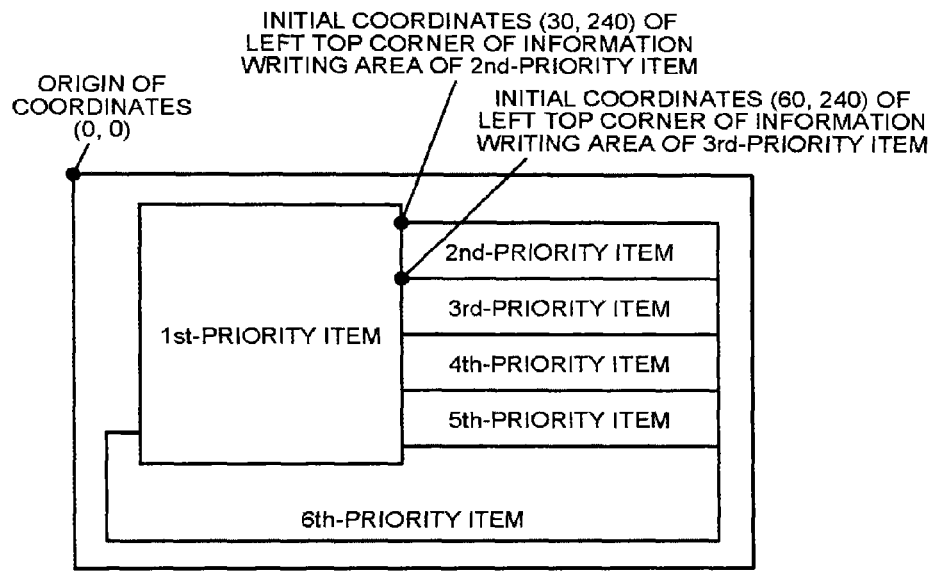
FIG. 33 is a diagram showing priorities of items on a layout.
Figure 34:
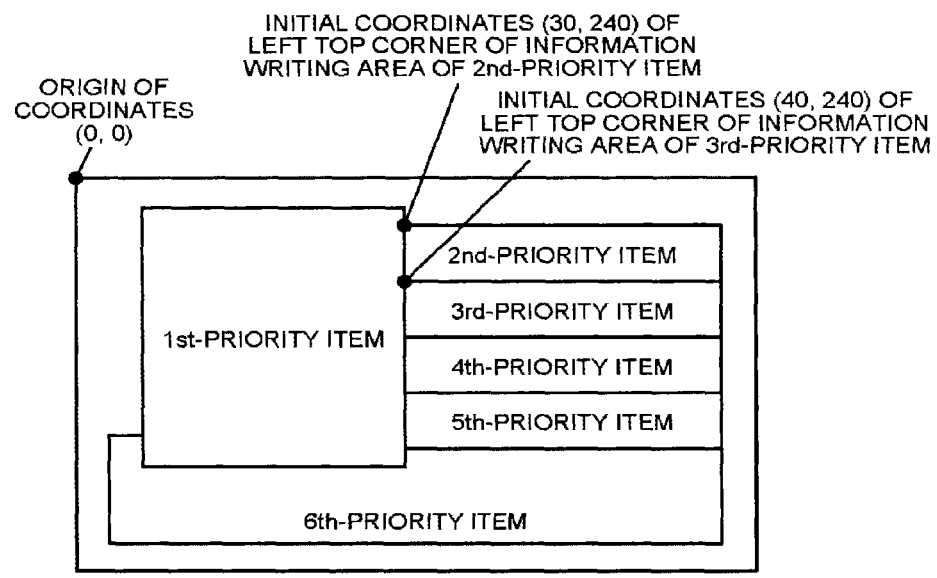
FIG. 34 is a diagram showing priorities of items on another layout.

Subsequently, a way to "determine whether a drawing area is a blank space" in the example shown in FIG. 31 is explained. FIGS. 33 and 34 are diagrams showing priorities of items on a layout. There is described an example where character strings of an access pass are horizontal writing as shown in FIG. 24; in the case of a vertical writing of access pass, the vertical direction and the horizontal direction are just replaced.

In the example shown in FIG. 33, first, in accordance with the layout selected through the screen shown in FIG. 24, information of ith-priority items (i=1, 2, 3, . . . ) is allocated to areas in descending order of priority. Specifically, with the left top corner of an access-pass print area as the origin, the default coordinates of the left top corner of each area (in the present embodiment, rectangular area) where information is written is stored in a memory. For example, an area of a 2nd-priority item is set with the initial coordinates (30, 240) as a default value, and an area of a 3rd-priority item is set with the initial coordinates (60, 240) as a default value.

Then, in descending order of priority of information, what extent the information occupies a corresponding writing area is calculated with reference to the number of characters of the information, the font size set in each area, and the setting of space between lines. Specifically, in the present embodiment, based on how many lines each piece of information requires, the occupancy rate with respect to the maximum number of lines assigned to each area is calculated. For example, when an area 2 is assigned ten characters per line and a maximum of three lines, if the number of lines required to actually write information on an access pass is one, the occupancy rate is 33%; if it is six, the occupancy rate is 200%.

If the occupancy rate of an area of an ith-priority item is less than 100%, which means there is a blank space; therefore, writing areas of (i+1)th and lower-priority items located below the ith-priority item are shifted to the upside. Specifically, as shown in FIG. 34, the area of the 2nd-priority item is assumed to be three-line information and have a vertical height of "30" in coordinate value (a vertical coordinate value 60-30). If the occupancy rate of the area of the 2nd-priority item is 33%, a height of 30×33%=10 in coordinate value is actually enough for the area of the 2nd-priority item. Therefore, there is a blank space with a height of 20 in coordinate value. Thus, respective start vertical coordinates of areas of 3rd and lower-priority items are shifted to the upside by the height of 20 from the initial coordinate values. Accordingly, the writing start position of the area of the 3rd-priority item becomes (40, 240).

On the other hand, if the occupancy rate is more than 100%, writing areas of (i+1)th and lower-priority items located below the ith-priority item are shifted to the downside in the same way. Incidentally, as for an area located below multiple areas like an area of a 6th-priority item, the maximum shift amount in respective shift amounts of the areas is adopted if it is shifted to the downside or the maximum shift amount in respective shift amounts of the areas is adopted if it is shifted to the upside, thereby it is possible to prevent the area from overlapping with an area of a high-priority item.

In this way, a writing area of information is determined in descending order of priority of information, and when an access-pass print area has been filled with information, the printing of remaining lower-priority information may be prohibited.

Incidentally, when low-priority information is printed above high-priority information, whether an area of the low-priority information extends downward is determined on the basis of the number of characters, and, if it overlaps with an area of the high-priority information, the printing of the low-priority information may be just prohibited.

Furthermore, the image forming system 1 can be configured in a different form from the above-described configuration. For example, the terminal device 3 or the printing device 32 can be configured to be equipped with the function of the image forming system 1 that forms an image on a printing medium. As a specific example, the access-pass creating unit 324 of the printing device 32 can be configured to further include a function as a creating unit that receives visitor information on a visitor input by an input device (an input unit) (not shown) and creates an information image including the received visitor information and a function as an acquiring unit that acquires the information image. Furthermore, the camera 30 can be configured to include a function as a creating unit that receives visitor information on a visitor input by an input device (an input unit) (not shown) and creates an information image including the received visitor information, and the access-pass creating unit 324 of the printing device 32 can be configured to further include a function as an acquiring unit that acquires the information image.

The above-described functions of the units of the printing device 32 are realized by the CPU (331 or 341) executing a program stored in a storage device (for example, the ROM 332, the HDD 334, the ROM 342, or the flash memory 344, etc.); however, it is not limited to this, and, for example, at least some of the functions of the units of the printing device 32 can be realized by a dedicated hardware circuit (for example, a semiconductor integrated circuit, etc.). Furthermore, the storage device can be realized by the HOD 334 on the main body 33 side, or can be realized by the flash memory 344 on the operation unit 34 side.

Furthermore, in the embodiment described above, the main body 33 and the operation unit 34 work independently of each other on separate operating systems; however, it is not limited to this, and, for example, the main body 33 and the operation unit 34 can be configured to work on the same operating system.

Moreover, a program executed by the printing device 32 according to the above embodiment can be provided in such manner that the program is recorded on a computer-readable recording medium, such as a CD-ROM, a flexible disk (FD), a CD-R, a digital versatile disk (DVD), or a universal serial bus (USB), in an installable or executable file format, or can be provided or distributed via a network such as the Internet. Furthermore, the program can be built into a non-volatile recording medium such as a ROM in advance.

According to the present invention, it is possible to issue a permit for visitor's access by using a blank space on a printing medium effectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming system that forms an image on a printing medium, the image forming system comprising:
   an input unit that receives input of visitor information on a visitor;
   a creating unit that creates an information image encoding the visitor information received by the input unit;
   an acquiring unit that acquires the information image;
   a reading unit that decodes the visitor information encoded in the information image acquired by the acquiring unit;
   a permit creating unit that creates permit data by placing an image, which includes the visitor information decoded from the information image by the reading unit and indicates permission for visitor's access, on a printing medium and places an image indicating added information on a blank space of the printing medium where no image is placed in accordance with a predetermined layout on the basis of the information image; and
   an issuing unit that issues a permit for visitor's access by printing an image in which the image indicating permission for access and the image indicating added information are placed on the printing medium by using the permit data.

2. The image forming system according to claim 1, wherein when the permit creating unit draws a drawing item, the permit creating unit determines whether there is a blank space in a drawing area of the printing medium, and draws the item when there is a blank space or does not draw the item when there is no blank space.

3. The image forming system according to claim 1, wherein the permit creating unit creates permit data including information acquired via a network.

4. The image forming system according to claim 1, wherein each time the permit creating unit creates permit data on the basis of the visitor information, the permit creating unit changes an image indicating added information and places the image.

5. The image forming system according to claim 1, wherein the information image is a QR code.

6. The image forming system according to claim 1, wherein the visitor information encoded into the information image includes at least one of:
   a visitor name;
   a visitor's company name;
   an address of a notification destination; and
   a valid period of the information image.

7. The image forming system according to claim 1, further comprising:
   a sending unit that sends the information image created by the creating unit over a network to a mobile terminal of the visitor, wherein the acquiring unit acquires the information image from a display device of the mobile terminal of the visitor.

8. An image forming method for forming an image on a printing medium, the image forming method comprising:
   receiving input of visitor information on a visitor;
   creating an information image encoding the received visitor information;
   acquiring the information image;
   decoding the visitor information encoded in the information image;

creating permit data by placing an image, which includes the visitor information decoded from the information image and indicates permission for visitor's access, on a printing medium and placing an image indicating added information on a blank space of the printing medium where no image is placed in accordance with a predetermined layout on the basis of the information image; and issuing a permit for visitor's access by printing an image in which the image indicating permission for access and the image indicating added information are placed on the printing medium by using the permit data.

9. The image forming method according to claim 8, wherein the information image is a QR Code.

10. The image forming method according to claim 8, wherein the visitor information encoded into the information image includes at least one of:
- a visitor name;
- a visitor's company name;
- an address of a notification destination; and
- a valid period of the information image.

11. The image forming method according to claim 8, further comprising:

sending the information image created by the creating unit over a network to a mobile terminal of the visitor, wherein the acquiring the information image includes acquiring the information image from a display device of the mobile terminal of the visitor.

12. An image forming system that forms an image on a printing medium, the image forming system comprising:
- an input unit that receives input of visitor information on a visitor;
- a creating unit that creates an information image encoding the visitor information received by the input unit;
- an acquiring unit that acquires the information image;
- a reading unit that decodes the visitor information encoded in the information image acquired by the acquiring unit;
- a permit creating unit that creates permit data by placing an image, which includes the visitor information decoded from the information image by the reading unit and indicates permission for visitor's access; and
- an issuing unit that issues a permit for visitor's access by printing an image in which the image indicating permission for access.

* * * * *